March 1, 1955    F. BALBONI ET AL    2,702,925
SERVING WINDOW
Filed July 14, 1954

INVENTORS
Francis Balboni and
BY John C. Balboni
Reed Ross
Atty. Agent

2,702,925

United States Patent Office
Patented Mar. 1, 1955

2,702,925

SERVING WINDOW

Francis Balboni, Turners Falls, and John C. Balboni, Chicopee Falls, Mass.

Application July 14, 1954, Serial No. 443,292

4 Claims. (Cl. 20—16)

This invention relates to improvements in serving windows.

The principal objects of the invention are directed to the provision of a unitary serving window construction adapted and arranged for setting in a wall of a building or the like and through which beverages, foods and the like may be served.

The serving window of the invention is characterized by a frame having associated therewith upper louvers, a lower window slidable relative to a stationary window and a shelf, all associated with a frame and functioning as a self-contained structure for installing in a wall or the like as a unit thereby obviating the usual fitting, assembling and adjusting of components at the place of installation.

All of the above objects we accomplish by means of such structure and relative arrangements of parts thereof, as will fully appear by a perusal of the description below and by various specific features which will be hereinafter set forth.

Figure 1:
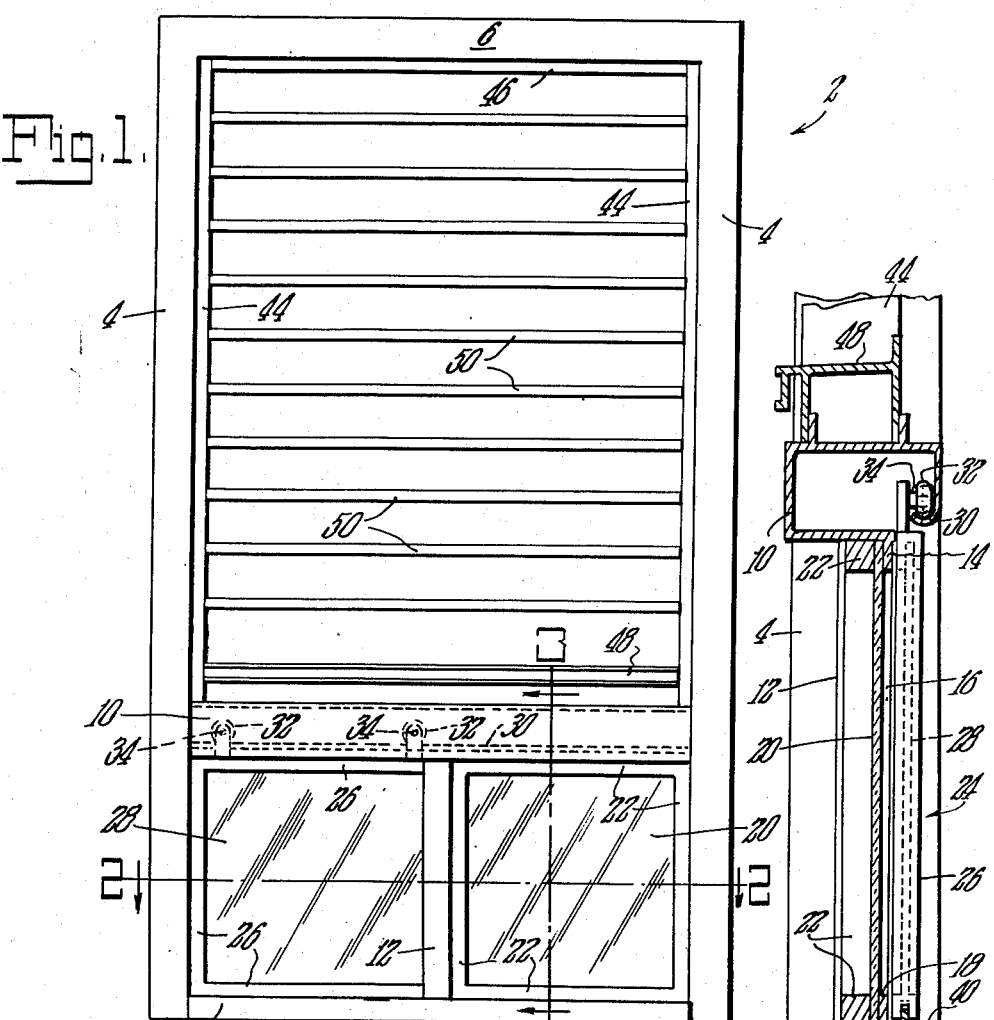
Figure 3:
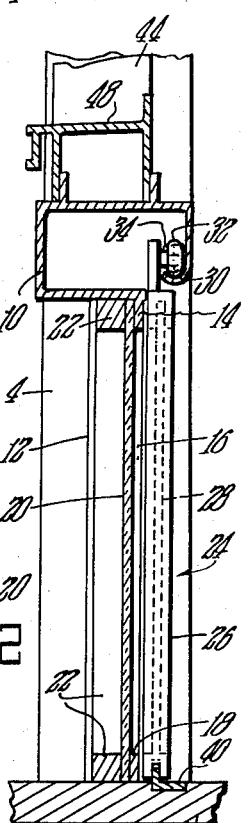
Figure 2:
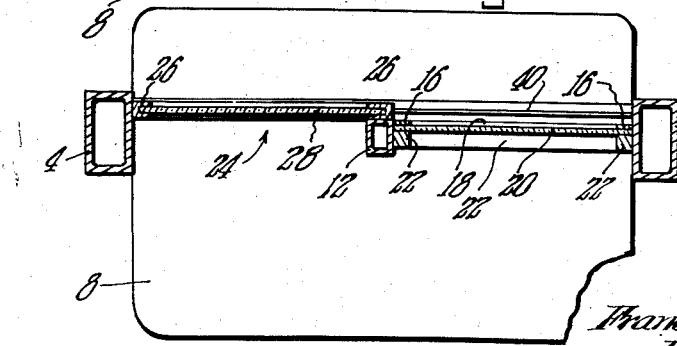

To the above cited and other ends and with the foregoing and various other novel features and advantages and other objects of our invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Fig. 1 is a front elevational view of a serving window construction embodying the novel features of the invention; and Figs. 2 and 3 are sectional plan and elevational views on the lines 2—2 and 3—3 of Fig. 1.

Referring now to the drawings more in detail, the invention will be fully described.

A frame 2 is provided which includes side members 4, an upper member 6 and a lower shelf 8 which are secured together to provide a strong rigid structure suitable for installing in a wall opening or the like.

A transverse member 10 has opposite ends secured to inner adjacent sides of the side members 4 and a vertical strut 12 has upper and lower ends secured to the underside of member 10 and the upper side of shelf 8.

Flanges 14 and 16 extend downwardly and inwardly from the member 10 and the side members 41 and a flange 18 extends across the shelf from one side member 4 to the strut 12. A light of glass 20 is held against the said flanges by moulding members 22 which are secured to side members 4, shelf 8 and members 10 and 12 providing a stationary window at one side of the shelf.

A slidable window 24 is formed by a frame including secured together channel members 26 which surround and hold a light of glass 28.

The inner side of the transverse member 10 is formed to provide a track 30 which extends between the side members 4. Rolls 32 rotatable on journals 34 at the upper side of the window 24 are rollable along said track 30 in opposite directions.

The movable window is movable from the closed position shown in Fig. 1 to an open position rearwardly of the stationary window whereby food and the like may be passed outwardly over the shelf.

The parts aside from the lights of glass may be formed from any material desired such as aluminum or the like and may be bolted or otherwise secured together as by welding.

An elongated guideway 40 for the bottom of the window 24 extends between the side members 4 and is secured in suitable manner to the shelf 8, see Fig. 3. Said guideway is received in a groove provided in the bottom member of the movable window as shown whereby said window is guided for straight-line movements back and forth.

A louvered structure includes side, upper and lower members 44, 46 and 48 respectively which are secured to the frame members 4, 6 and 10 respectively so as to provide a unitary structure. A plurality of louvers 50 of usual form have opposite ends associated with the side members 44 preferably in such a manner that they may swing between the open position shown and a closed position.

From the foregoing it will be observed that a unitary structure is provided which is adapted for installation in a wall structure and includes a frame and a shelf as well as a window movable relative to a stationary window and an upper louvered section.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A unitary self-contained serving window structure comprising, spaced vertical side members having a transverse member secured to upper ends and a shelf secured to lower ends thereof, a horizontal transverse member above said shelf extending between and secured to said side members, a vertical strut having opposite ends secured to said horizontal member and shelf intermediate said side members forming with said side members and horizontal member and shelf spaces at opposite sides of said strut, a stationary window in one of said spaces, and a window movably mounted on the rear of said horizontal member for moving between an open position rearwardly of said stationary window and a closed position over the other of said spaces.

2. A unitary self-contained serving window structure comprising, spaced vertical side members having a transverse member secured to upper ends and a shelf secured to lower ends thereof, a horizontal transverse member above said shelf extending between and secured to said side members, a vertical strut having opposite ends secured to said horizontal member and shelf intermediate said side members forming with said side members and horizontal member and shelf spaces at opposite sides of said strut, a stationary window in one of said spaces, a window movably mounted on the rear of said horizontal member for moving between an open position rearwardly of said stationary window and a closed position over the other of said spaces, side and upper and lower members secured to the first-named side and upper members and to said horizontal member, and a plurality of louvers extending between said last named side members.

3. A unitary self-contained serving window structure comprising, spaced vertical side members having a transverse member secured to upper ends and a shelf secured to lower ends thereof, a horizontal transverse member disposed above the shelf and extending between and secured to said side members, a vertical strut having opposite ends secured to said horizontal transverse member and shelf intermediate said side members and forming spaces on opposite sides of said strut, a stationary window in one of said spaces, and a window movably mounted on the rear of said horizontal member for moving between open position and closed position.

4. A unitary self-contained serving window structure comprising, spaced vertical side members having a transverse member secured to upper ends and a shelf secured to lower ends thereof, a horizontal transverse member above said shelf extending between and secured to said side members, a vertical strut having opposite extremities secured to said horizontal member and shelf intermediate said side members and forming with said vertical side members and horizontal member and shelf, spaces at opposite sides of said strut, a stationary window located in one of the spaces, a window movably mounted on the rear of said horizontal member for moving between an open position and a closed position, side and upper and lower members secured to the first-named side and upper members and to said horizontal member, and a plurality of louvers extending between said last named side members.

No references cited.